(12) United States Patent
Hung

(10) Patent No.: US 10,627,878 B2
(45) Date of Patent: Apr. 21, 2020

(54) ELECTRONIC DEVICES AND COOLING METHODS ADAPTED TO ELECTRONIC DEVICE

(71) Applicant: Quanta Computer Inc., Taoyuan (TW)

(72) Inventor: Li-Te Hung, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 69 days.

(21) Appl. No.: 15/983,628

(22) Filed: May 18, 2018

(65) Prior Publication Data
US 2019/0113956 A1  Apr. 18, 2019

(30) Foreign Application Priority Data

Oct. 18, 2017  (TW) .............................. 106135653 A

(51) Int. Cl.
*G06F 1/20* (2006.01)
*G05D 13/62* (2006.01)
*G05D 23/19* (2006.01)

(52) U.S. Cl.
CPC .............. *G06F 1/20* (2013.01); *G05D 13/62* (2013.01); *G05D 23/1931* (2013.01)

(58) Field of Classification Search
CPC . G06F 1/20; G06F 1/203; G06F 1/206; G06F 1/324; G06F 1/3206; G05D 13/62;
(Continued)

(56) References Cited

U.S. PATENT DOCUMENTS 8,060,761 B2    11/2011  Lai et al.
8,761,956 B2 *   6/2014  Chen .................. H05K 7/20836
                                              700/300
(Continued)

FOREIGN PATENT DOCUMENTS

TW      200727118 A    7/2007
TW      200919170 A    5/2009
TW      201342018 A    10/2013

OTHER PUBLICATIONS

Chinese language office action dated Mar. 29, 2019, issued in application No. TW 106135653.

*Primary Examiner* — M. N. Von Buhr
(74) *Attorney, Agent, or Firm* — McClure, Qualey & Rodack, LLP

(57) ABSTRACT

An electronic device is provided, including a processor, a graphics processing unit, a first temperature sensor, a second temperature sensor, an embedded controller and a memory. The first temperature sensor detects the temperature of the processor. The second temperature sensor detects the temperature of the graphics processing unit. The embedded controller increases the current fan speed according to a temperature change of the processor, a temperature change of the graphics processing unit, and/or a change of an operating state of the graphics processing unit. When the temperature of the processor rises to a first predetermined value, the temperature of the graphics processing unit is raised and the operating state of the graphics processing unit is changed, and the embedded controller increases the current fan speed according to a first speed table corresponding to the graphics processing unit stored in the memory.

8 Claims, 5 Drawing Sheets

(58) Field of Classification Search
CPC .......... G05D 23/1931; H05K 7/20136; H05K 7/20209
See application file for complete search history.

(56) References Cited

U.S. PATENT DOCUMENTS

| | | | |
|---|---|---|---|
| 9,170,586 B2 | 10/2015 | Hung | |
| 2007/0162160 A1 | 7/2007 | Chang et al. | |
| 2009/0100277 A1* | 4/2009 | Lai .................... | G06F 1/3206 713/300 |
| 2009/0231809 A1* | 9/2009 | Koide .................. | G06F 1/203 361/697 |
| 2010/0117579 A1* | 5/2010 | Culbert ................ | G06F 1/20 318/471 |
| 2010/0228403 A1* | 9/2010 | Eto .................... | G05D 23/1931 700/300 |
| 2012/0287571 A1* | 11/2012 | Santos ................. | G06F 1/206 361/679.48 |
| 2013/0079947 A1* | 3/2013 | Wu .................... | H05K 7/20836 700/300 |
| 2013/0269922 A1* | 10/2013 | Hung .................. | G06F 1/206 165/287 |
| 2014/0117908 A1* | 5/2014 | Busch .................. | H02P 1/04 318/471 |
| 2015/0234450 A1* | 8/2015 | Lin ..................... | G06F 1/3293 713/323 |
| 2017/0147048 A1* | 5/2017 | Park ................... | G06F 1/324 |
| 2017/0168531 A1* | 6/2017 | Casparian ............. | G06F 1/206 |

\* cited by examiner

ELECTRONIC DEVICES AND COOLING METHODS ADAPTED TO ELECTRONIC DEVICE

CROSS REFERENCE TO RELATED APPLICATIONS

This Application claims priority of Taiwan Patent Application No. 106135653, filed on Oct. 18, 2017, the entirety of which is incorporated by reference herein.

BACKGROUND OF THE INVENTION

Field of the Invention

The present invention relates to an electronic devices and a cooling method, and more particularly to an electronic device and a cooling method for providing different fan speeds for an electronic device according to temperature changes of the processor and the graphics processing unit.

Description of the Related Art

As users' demands for the image quality of display screens have increased, notebooks generally have been equipped with independent graphics processing units. In order to avoid the performance of the electronic device suffering due to poor heat dissipation during high-performance operation, notebooks with an independent graphics processing unit must have a powerful cooling system. FIG. 1 is a schematic diagram of a cooling system used in common low-end notebooks. As shown in the figure, in order to reduce the cost of the cooling module, to avoid a thick body and limitations on video signal routing, the cooling is generally accomplished by a single elongated heat pipe passing through a processor 110 and a graphics processing unit 120 and connected to heat dissipation fins, and cooled by a fan 140 through a cooling hole 150. However, this cooling method might cause some problems. Because the processor 110 is farther away from the cooling hole 150 than the graphics processing unit 120, heat generated by the graphics processing unit 120 is in between, and there is no dedicated heat pipe, meaning that heat generated by the processor may not be effectively transmitted to the cooling hole. Furthermore, when the graphics processing unit 120 is operating in a high-performance state, heat generated by the graphics processing unit 120 may raise the temperature of the processor 110, which results in a misjudgment of the system and an erroneous adjustment of the performance of the processor 110, thereby affecting user experience. In addition, simply increasing the fan speed for cooling will cause loud fan noise and improper battery power consumption. Furthermore, when the fan is running at a high speed, dust can be easily become stuck to the blade, and too much dust will make the fan run louder, and may eventually shorten the lifespan of the fan, and even of the entire electronic device. Therefore, how to correctly find the heat source, reasonably adjust the fan speed, effectively reduce the temperature of the electronic device, and maintain stability of the system and the performance of the graphics processing unit are problems that need to be solved immediately.

BRIEF SUMMARY OF INVENTION

An embodiment of the present invention provides an electronic device, including a processor, a graphics processing unit, a first temperature sensor, a second temperature sensor, an embedded controller and a memory. The processor operates in one of a plurality of working states. The graphics processing unit executes at least one drawing operation. The first temperature sensor detects the temperature of the processor. The second temperature sensor detects the temperature of the graphics processor. The embedded controller increases the current fan speed according to a temperature change of the processor, a temperature change of the graphics processing unit, and a change in the operating state of the graphics processing unit. The memory stores a first fan speed table corresponding to the graphics processor and a second fan speed table corresponding to the processor. The embedded controller increases the current fan speed according to the first fan speed table corresponding to the graphics processor when the temperature of the processor rises to a first predetermined value and the temperature and the operating state of the graphics processor change.

Another embodiment of the present invention provides a cooling method, adapted to an electronic device, including: executing, using a processor, one of a plurality of working states; executing, using a graphics processing unit, at least one drawing operation; sensing, using a first temperature sensor, the temperature of the processor; sensing, using a second temperature sensor, the temperature of the graphics processing unit; and adjusting, using the embedded controller, the current fan speed according to a temperature change of the processor, a temperature change of the graphics processing unit, and/or a change of the operation state of the graphics processing unit; wherein the embedded controller increases the current fan speed according to a first fan speed table corresponding to the graphics processing unit when the temperature of the processor rises to a first predetermined value and the temperature of the graphics processing unit rises and the operating state of the graphics processing unit changes.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present electronic device and cooling methods can be applied will become apparent from the detailed description provided herein. It should be understood that the detailed description and specific examples, while indicating exemplary embodiments of electronic devices and cooling methods, are intended for the purposes of illustration only and are not intended to limit the scope of the invention.

Figure 1:
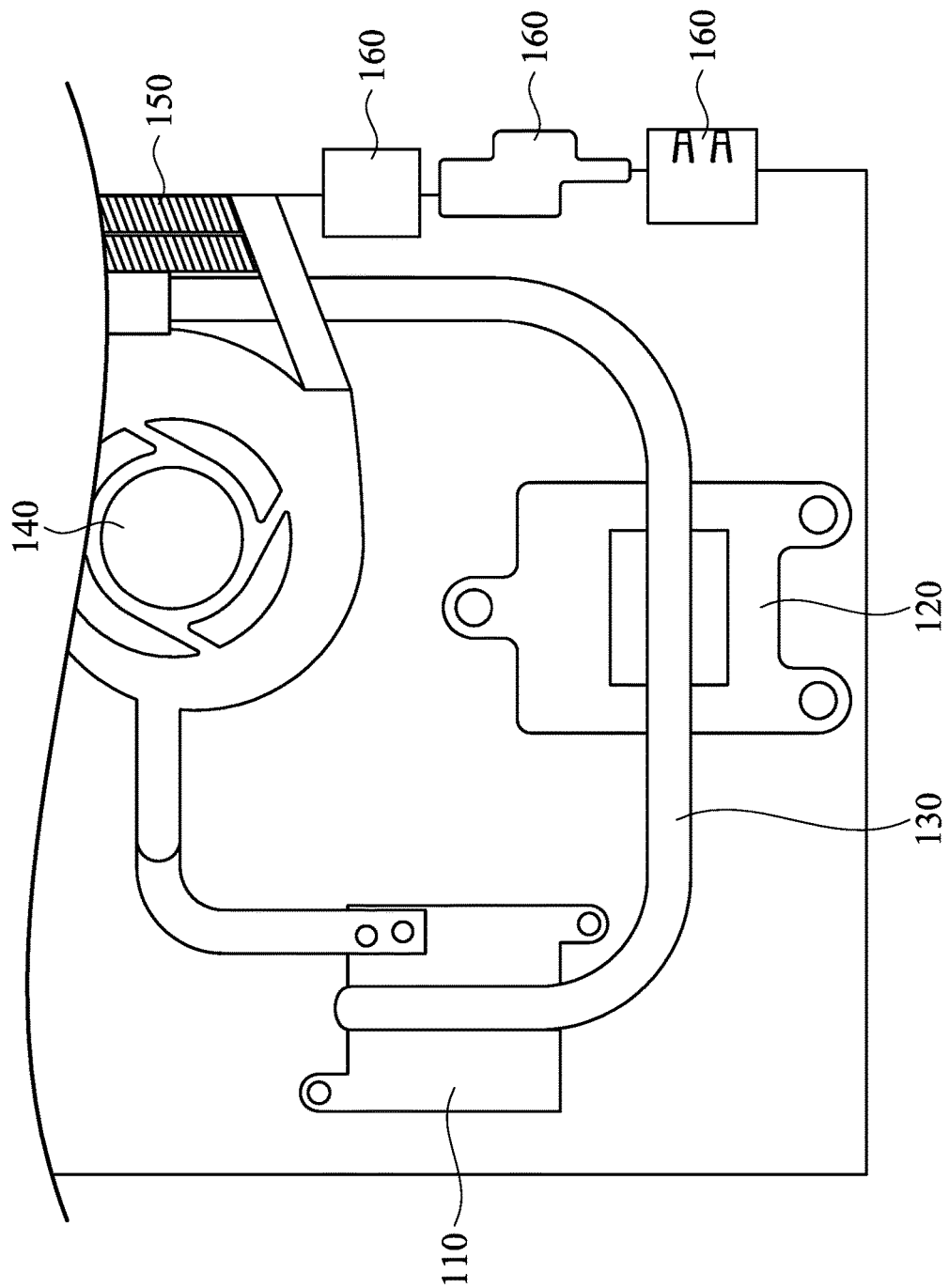
FIG. 1 is a schematic diagram of a cooling system of a common electronic device.
Figure 2:
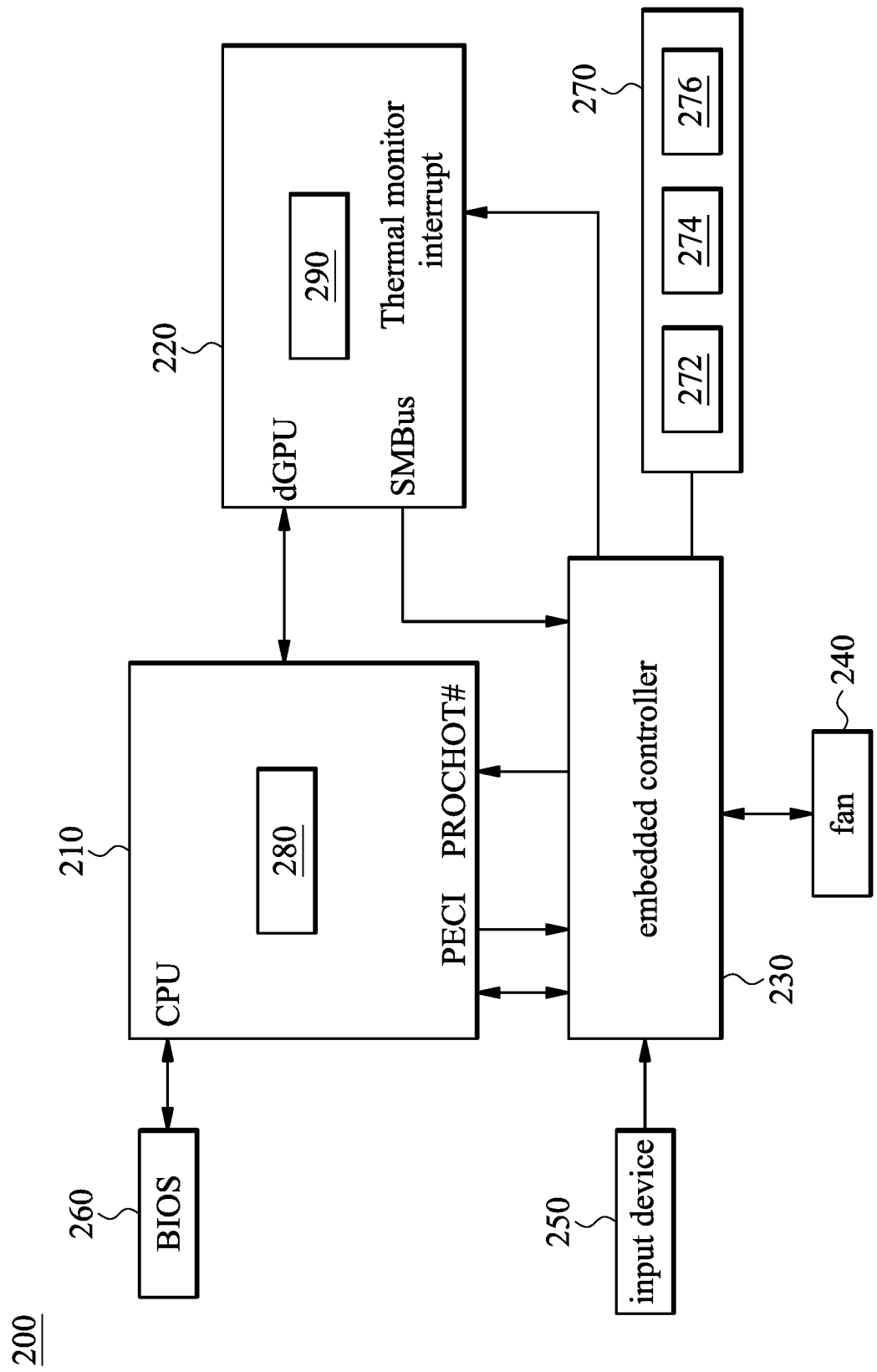
FIG. 2 is a block diagram of an electronic device in accordance with an embodiment of the present invention.

FIG. 2 is a schematic diagram of an electronic device in accordance with an embodiment of the present invention. As shown in the figure, the electronic device 200 includes a processor (CPU) 210, a graphics processing unit (discrete graphics processing unit (dGPU)) 220, an embedded controller (EC) 230, a fan 240, an input device 250, a basic input/output system 260 (hereinafter referred as BIOS) and a memory 270. The processor 210 includes a temperature sensor 280 and the graphics processing unit 220 includes a temperature sensor 290. The temperature sensor 280 is used to detect a temperature of the processor 210 and the temperature sensor 290 is used to detect a temperature of the graphics processing unit 220. The processor 210 executes program instructions to achieve a specific function and has a plurality of different working states. The processor 210 further includes a Platform Environmental Control Interface (PECI) for outputting a temperature and power consumption of the processor 210 to the embedded controller 230. The graphics processing unit 220 is an independent graphics processing unit having a plurality of operating states for executing at least one drawing operation according to instructions, and outputs its temperature to the embedded controller 230 via the system management bus (SMBus). The embedded controller 230 respectively couples to the processor 210, the graphics processing unit 220, the fan 240, the input device 250 and the memory 270, and receives the current temperature of the processor 210, the operating state and the current temperature of the graphics processing unit 220, an input signal of the input device 250, the current speed of the fan 240, and the like. The embedded controller 230 controls the fan speed 240 according to the temperature change of the processor 210, the temperature change of the graphics processing unit 220, and the change of the operating state of the graphics processing unit 220. The memory 270 can be a flash memory or a static random access memory (SRAM) of the embedded controller 230 for storing a fan speed table 272 corresponding to the graphics processing units 220 and another fan speed table 274 corresponding to the processor 210. The fan speed in the fan speed table 274 corresponding to the processor 210 is greater than the fan speed in the fan speed table 272 corresponding to the graphics processing unit 220 at the same temperature.

According to an embodiment of the present invention, when the system starts to operate, the embedded controller 230 firstly drives the fan 240 according to the current temperature of the processor 210 and the fan speed specified in the fan speed table 274 corresponding to the processor 210. The embedded controller 230 further records the current temperature of the processor 210 every predetermined time interval, and records the current temperature of the graphics processing unit 220 and its operating state at the same time. After the system is operating for a period of time, when the embedded controller 230 detects that the temperature of the processor 210 rises to a first predetermined value, such as when the temperature raises from 65° C. to 75° C., the embedded controller 230 first determines whether the current temperature of the graphics processing unit 220 is the same as the recorded temperature or less than the recorded temperature in a predetermined value, e.g., 5° C., and whether its system operating state is changed in order to avoid misjudgment. If the embedded controller 230 determines that the temperature of the graphics processing unit 220 is increased slightly and the operating state does not change, then the embedded controller 230 determines that the increase of the temperature of the processor 210 is not affected by the thermal energy generated by the graphics processing unit 220, and the embedded controller 230 increases the current fan speed to a first fan speed according to the fan speed table 274 of the processor 210, such as when the fan speed is increased from 3600 rpm to 4400 rpm.

On the contrary, if the embedded controller 230 determines that the temperature of the graphics processing unit 220 rises significantly, such as when the temperature has risen more than a predetermined value (5° C.) and its power consumption is increased, e.g. computing performance increase, by obtaining the current temperature of the graphics processing unit 220 and its operating state, and the embedded controller 230 determines that the temperature raise of the processor 210 is affected by the temperature raise of the graphics processing unit 220 rather than the processor 210 itself. Therefore, the embedded controller 230 increases the current fan speed to a first fan speed, such as when the fan speed is increased from 3600 rpm to 4000 rpm, by reading the fan speed table 272 corresponding to the graphics processing unit 220 stored in the memory 270 to avoid excessive fan noise and achieve a balance between performance and power consumption.

Next, after increasing the fan speed, the embedded controller 230 may speed up to obtain the temperature of the processor 210, such as increasing the reading speed from every 1 second to every 0.5 seconds, to determine whether the cooling action is effective. However, when the temperature of the processor 210 raises continuously and approaches a threshold value, e.g., close to 95° C., the embedded controller 230 reduces the operating frequency of the processor 210 and the graphics processing unit 220, e.g., by triggering the PROCHOT# pin of the processor 210 or the "Thermal monitor interrupt" pin of the graphics processing unit 220, and increases the current fan speed 240 to a maximum speed to rapidly cool the processor 210 or the graphics processing unit 220 to prevent the electronic device or the system from crashing. When an abnormal temperature situation is remedied, the embedded controller 230 resumes the normal processing flow.

According to another embodiment of the present invention, after the system is operated for a period of time, when the embedded controller 230 determines that the temperature of the processor 210 has risen, such as when the temperature raises from 50° C. to 65° C.), but the current fan speed 240 is higher than a predetermined speed in the fan speed table 274 corresponding to the processor 210, the embedded controller 230 determines whether the rise in temperature in the processor 210 was caused by itself. At this moment, the embedded controller determines whether the processor 210 is in an idle mode repeatedly, such as based on the temperature received from a temperature sensing element of the processor 210 every 256 ms, (in this embodiment, it takes 7.5 seconds (30 times) to determine the working state of the processor), and further determines whether the input signal is generated by the input device 250, such as a keyboard, a touch pad, etc., to confirm whether the user is using the electronic device. The embedded controller 230 can confirm the working state of the processor 210 by determining the power consumption of the processor 210 and the serial voltage identification (SVID) data of a power supply through the PECI. However, when the embedded controller 230 confirms that the processor 210 remains in the idle mode and the user is not using the electronic device, the embedded controller 230 determines that only the graphics processing unit 220 executes a large amount of drawing operations at this time, and the thermal energy generated thereby affects the cooling efficiency of the processor 210 and causes the temperature to increase, then the embedded controller 230 notifies the BIOS directly through the "system control interrupt (SCI) event" to request a reduction of power consumption by the processor 210. In addition, after the "SCI event" is triggered, the BIOS notifies OSPM (Operating System (OS) Power Management) via Advanced Configuration and Power Interface Performance Present Capabilities (ACPI_PPC) to set the GPU (integrated graphics processor (IGP)) in the processor 210 to a Maximum Battery Life Setting to quickly lower the power consumption and the temperature of the processor 210. The setting as described will not reduce the performance of the electronic device 200, because the graphics processing unit 220 will execute the drawing operations of the system. Actively accelerating a low temperature operation of the processor 210 can also help to increase the cooling efficiency of the heat pipe, that is, by increasing convection of water and air in the heat pipe and with the control of the fan, the cooling efficiency can be increased. In addition, after a predetermined period of time, if the embedded controller 230 detects that the temperature of the processor 210 is not reduced effectively, such as when the temperature reaches a predetermined threshold more than a certain number of times within a predetermined time, then the embedded controller 230 increases the current fan speed according to another fan speed table 276, e.g., the fan speed is increased up to 4200 rpm, to speed up the cooling of the processor 210 to prevent the electronic device 200 from overheating.

Figure 3A:
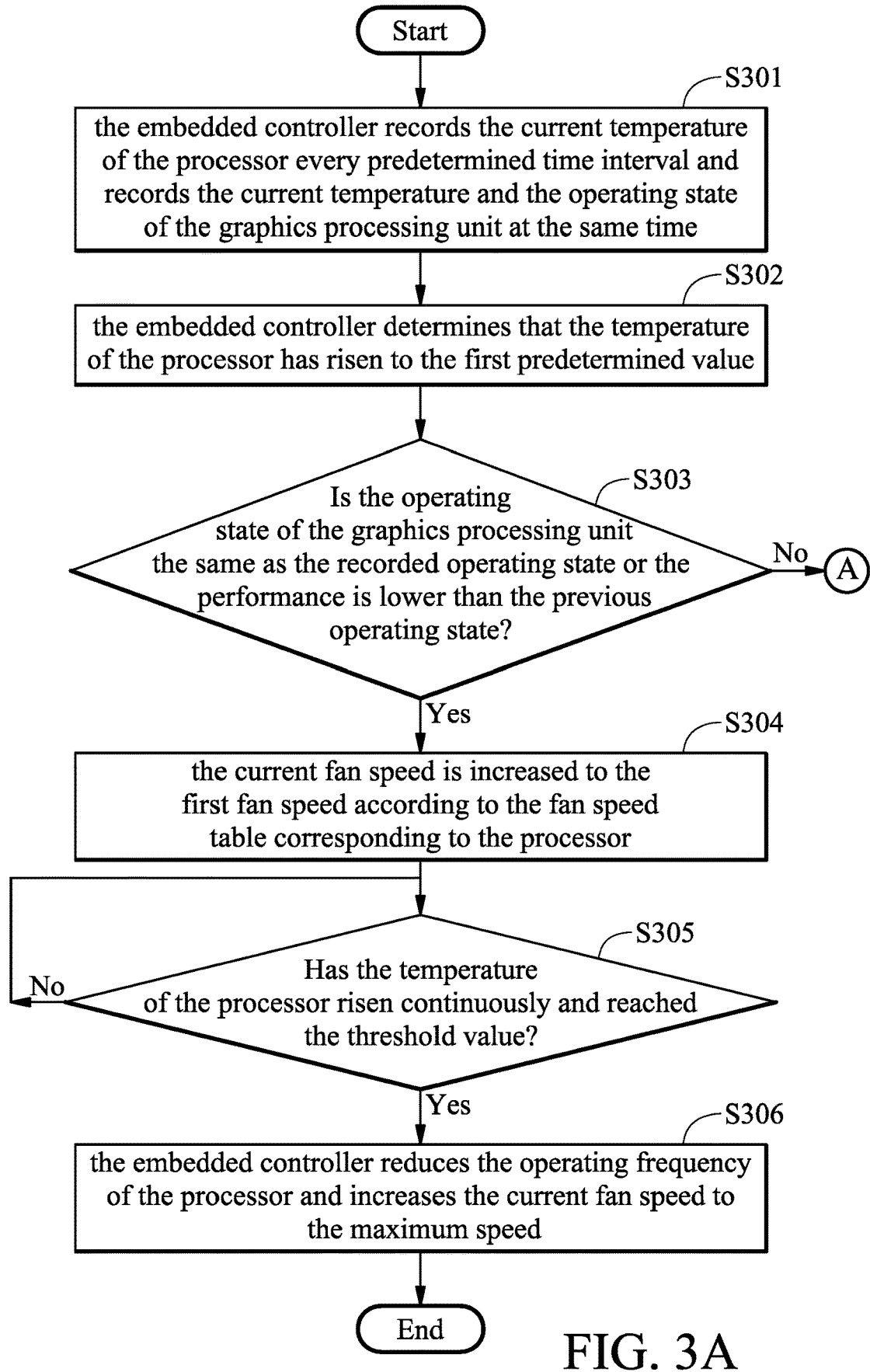
FIGS. 3A-3B are flowcharts of a cooling method of the electronic device in accordance with an embodiment of the present invention.
Figure 3B:
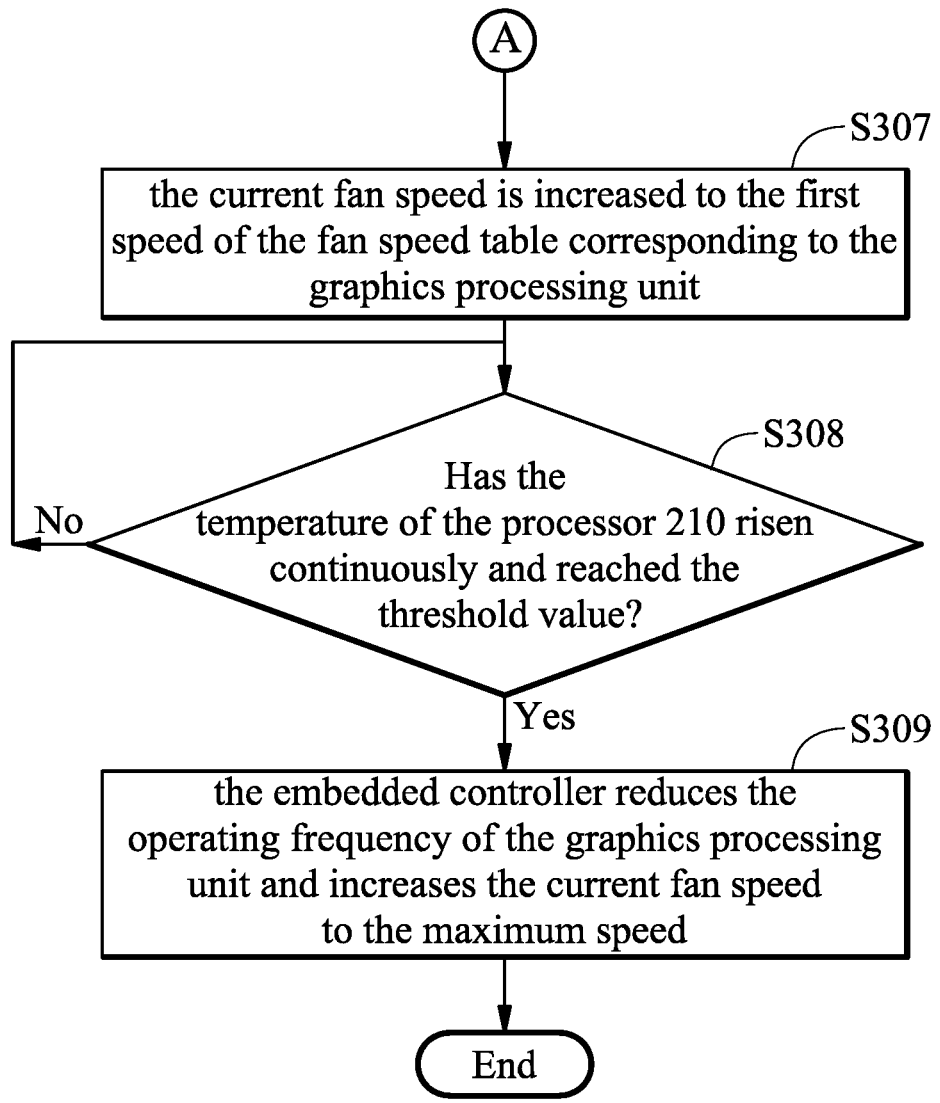

FIG. 3 is a flow chart of the cooling method in accordance with an embodiment of the invention. In step S301, after the electronic device has begun working, the embedded controller 230 records the current temperature of the processor 210 every predetermined time interval and records the current temperature and the operating state of the graphics processing unit 220 at the same time. In step S302, the embedded controller 230 determines that the temperature of the processor 210 has risen to the first predetermined value. In step S303, the embedded controller 230 determines whether the operating state of the graphics processing unit 220 is the same as the recorded operating state or the performance is lower than the previous operating state.

When the embedded controller 230 determines that the operating state of the graphics processing unit 220 has not changed or the performance is reduced, which means the temperature increase of the processor 210 is not affected by the thermal energy generated by the graphics processing unit 220, the method proceeds to step S304, and the embedded controller 230 increases the current fan speed to the first fan speed according to the fan speed table 274 corresponding to the processor 210. In step S305, after the fan speed is increased, the embedded controller 230 determines whether the temperature of the processor 210 has risen continuously and has reached the threshold value. When the temperature of the processor 210 reaches the threshold value, the method proceeds to step 5306, the embedded controller 230 reduces the operating frequency of the processor 210, such as by triggering the PROCHOT# pin of the processor 210, and increases the current fan speed to the maximum speed.

Conversely, when the embedded controller 230 determines that the temperature of the graphics processing unit 220 has significantly increased and the performance is increased, which means the temperature increase of the processor 210 is affected by the temperature increase of the graphics processing unit 220 rather than the processor 210 itself, the method proceeds to step S307, and the embedded controller 230 reads the fan speed table 272 corresponding to the graphics processing unit 220 from the memory 270 and increases the current fan speed to the first speed of the fan speed table 272 corresponding to the graphics processing unit 220. In step S308, after the fan speed is increased, the embedded controller 230 determines whether the temperature of the processor 210 has risen continuously and has reached the threshold value. When the temperature of the processor 210 reaches the threshold value, the method proceeds to step 5309, in which the embedded controller 230 reduces the operating frequency of the graphics processing unit 220, such as by triggering the "Thermal monitor interrupt" pin of the graphics processing unit 220, and increases the current fan speed to the maximum speed.

Figure 4:
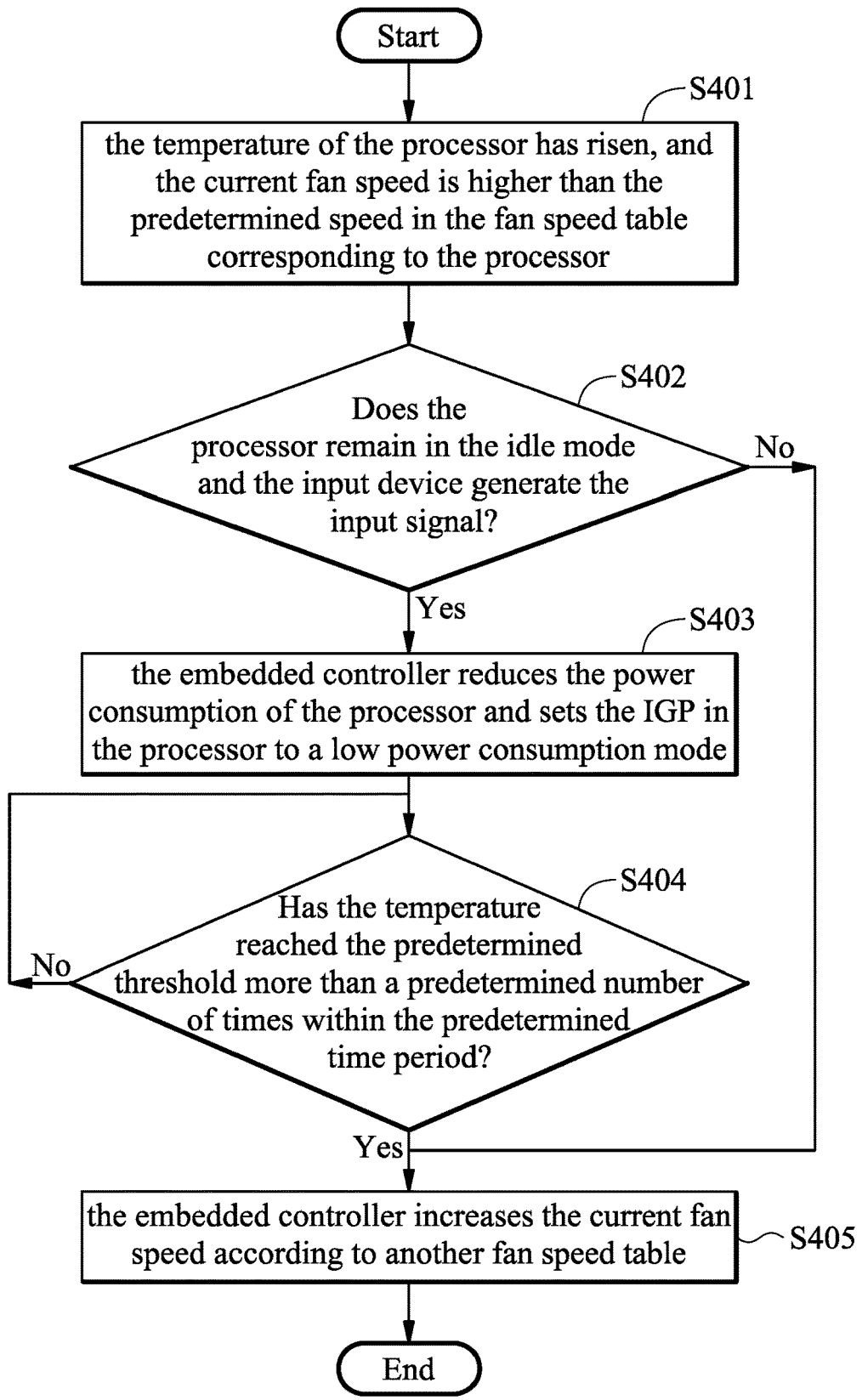
FIG. 4 is a flow chart of the cooling method of the electronic device in accordance with another embodiment of the present invention.

FIG. 4 is a flow chart of the cooling method in accordance with another embodiment of the present invention. In step S401, the embedded controller 230 determines that the temperature of the processor 210 has risen, and the current fan speed is higher than the predetermined speed in the fan speed table 274 corresponding to the processor 210. Then, the method proceeds to step S402, in which the embedded controller determines whether the processor 210 remains in the idle mode and determines whether the input signal of the input device 250 is generated to confirm whether the user is using the electronic device. When the embedded controller 230 confirms that the processor 210 remains in the idle mode, the user is not using the electronic device and the graphics processing unit is operating in a high-performance state, the method proceeds to step S403, in which the embedded controller 230 reduces the power consumption of the processor 210, and sets the IGP in the processor 210 to a low power consumption mode to rapidly reduce the power consumption and temperature of the processor 210. In step S404, after a predetermined period of time, if the embedded controller 230 determines that the temperature has reached the predetermined threshold more than a predetermined number of times within the predetermined time period, the method proceeds to step S405, in which the embedded controller 230 increases the current fan speed according to another fan speed table 276 to speed up the cooling of the processor 210 to prevent the electronic device 200 from overheating. In addition, when the embedded controller 230 determines that the processor 210 is not in the idle mode or that the user is using the electronic device, the method also proceeds to step S405, and the embedded controller 230 increases the current fan speed according to another fan speed table 276.

As described above, according to the embodiments of the electronic device and the cooling method thereof, when the temperature of the processor has risen, the correct heat source can be confirmed by determining whether the temperature of the graphics processing unit has risen and whether its operating state has changed, so that the noise caused by excessive fan speed can be reduced and the wrong cooling conditions can be avoided. Furthermore, the operating frequency of the processor or the graphics processing unit can be adjusted according to the correct heat source so as to increase the performance of the electronic device to provide users with a better user experience.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An electronic device comprising:
   a fan;
   a processor, operating in one of a plurality of working states;
   a graphics processing unit, executing at least one drawing operation;
   a first temperature sensor, detecting a temperature of the processor;
   a second temperature sensor, detecting a temperature of the graphics processing unit;

an embedded controller, increasing a current fan speed of the fan according to a temperature change of the processor, a temperature change of the graphics processing unit, and a change in an operating state of the graphics processing unit; and a memory, storing a first fan speed table corresponding to the graphics processing unit and a second fan speed table corresponding to the processor, wherein the first fan speed table is for adjusting a fan speed of the fan according to the temperature of the graphics processing unit and the second fan speed table is for adjusting the fan speed of the fan according to the temperature of the processor;

wherein the embedded controller increases the current fan speed of the fan according to the first fan speed table corresponding to the graphics processing unit when the temperature of the processor rises to a first predetermined value and the temperature and the operating state of the graphics processing unit change, wherein the embedded controller increases the current fan speed of the fan according to the second fan speed table corresponding to the processor when the temperature of the processor rises to the first predetermined value, but the temperature and the operating state of the graphics processing unit do not change, and wherein a fan speed corresponding to the first predetermined value in the first fan speed table is greater than a fan speed corresponding to the first predetermined value in the second fan speed table.

2. The electronic device as claimed in claim 1, wherein the embedded controller reduces an operating frequency of the graphics processing unit and increases the current fan speed of the fan to a maximum speed when the temperature of the processor rises to a threshold value from the first predetermined value.

3. The electronic device as claimed in claim 1, wherein the embedded controller reduces an operating frequency of the processor and increases the fan speed to a maximum speed when a current temperature of the processor rises to a threshold value from the first predetermined value.

4. The electronic device of claim 1, wherein the embedded controller reduces an operating frequency of the processor when the current fan speed of the fan is greater than a fan speed corresponding to the first predetermined value in the second fan speed table, the processor operates in an idle state and the embedded controller does not receive any input signal from an input device.

5. The electronic device according to claim 4, wherein the embedded controller increases a fan speed according to a third fan speed table when the embedded controller determines that the temperature of the processor rises to a second predetermined value, wherein the third fan speed table is for adjusting a fan speed of the fan according to the temperature of the processor.

6. A cooling method, adapted to an electronic device, comprising:

executing, using a processor, one of a plurality of working states;

executing, using a graphics processing unit, at least one drawing operation;

sensing, using a first temperature sensor, a temperature of the processor;

sensing, using a second temperature sensor, a temperature of the graphics processing unit; and adjusting, using an embedded controller, a current fan speed of a fan according to one of a temperature change of the processor, a temperature change of the graphics processing unit and a change of an operation state of the graphics processing unit;

wherein the embedded controller increases the current fan speed of a fan according to a first fan speed table corresponding to the graphics processing unit when the temperature of the processor rises to a first predetermined value and the temperature of the graphics processing unit rises and an operating state of the graphics processing unit changes, wherein the first fan speed table is for adjusting a fan speed of the fan according to the temperature of the graphics processing unit, wherein the embedded controller increases the current fan speed according to a second fan speed table corresponding to the processor when the temperature of the processor rises to the first predetermined value, but the temperature and the operating state of the graphics processing unit do not change, wherein the second fan speed table is for adjusting the fan speed of the fan according to the temperature of the processor, a fan speed corresponding to the first predetermined value in the first fan speed table is greater than a fan speed corresponding to the first predetermined value in the second fan speed table.

7. The cooling method as claimed in claim 6, wherein the embedded controller reduces an operation frequency of the graphics processing unit and increases the current fan speed to a maximum speed when a current temperature of the processor rises to a threshold value from the first predetermined value.

8. The cooling method as claimed in claim 6, wherein the embedded controller reduces an operating frequency of the processor and increases the current fan speed to a maximum speed when the temperature of the processor rises to a threshold value from the first predetermined value.

* * * * *